INVENTOR
ELWOOD C. ROGERS, JR.

United States Patent Office 3,439,177
Patented Apr. 15, 1969

3,439,177
RADIATION-SENSITIVE CONTROL FOR PHOTO-
GRAPHIC REPRODUCING DEVICE
Elwood C. Rogers, Jr., Indianapolis, Ind., assignor to Foto-
matic Corporation, Indianapolis, Ind., a corporation of
Indiana
Filed Aug. 5, 1966, Ser. No. 570,660
Int. Cl. G01n 21/30
U.S. Cl. 250—219          10 Claims This invention relates generally to light responsive controls and particularly to an automatic exposure control for photographic copiers, such as micro-film cameras, in which the slope of the photographic lamp output to document reflectivity or density curve is adjustable.

Photographic exposure, in for example continuous type micro-film cameras, can be controlled either by (1) varying the time of exposure to which the photographic emulsion is exposed to light or (2) holding the time of exposure constant and varying the intensity of the light in response to subject (to be photographed) brightness or document reflectivity.

It is not unknown in the prior art related to microfilm reproduction to control film exposure automatically and continuously in accordance with the relative brightness or darkness of the surface of the documents as they are fed sequentially to the photograph station. An automatic exposure control which utilizes the same light source for measuring document brightness and for photographing the document is disclosed in my copending patent application Ser. No. 229,378, now abandoned filed Oct. 9, 1962, and titled, "Automatic Exposure Control for Photographic Copiers."

The control of the present invention resembles that of my copending application referred to above in that it uses a photocell responsive to light reflected from the subject document as the document is positioned immediately adjacent the photograph station to control the intensity of the photographic light source. It has additional, improvement features, however, in that the control of the present invention incorporates an additional photocell which responds, not to light reflected from the documents, but to light reaching the additional photocell directly from the photographic source. By adjusting the relative effect of the response of the two photocells on the control circuit controlling the photographic light source intensity, the change in light source intensity for a given change of document reflectivity or density can be varied as desired.

The primary object of the present invention is to provide an automatic exposure control for photographic copying in which the intensity of a photographic light source is controlled by the density or reflectivity (or both) of an object to be photographically reproduced, with the response of the light source to a unit change in the density or reflectivity of the object being readily adjustable.

It is a further object of the present invention to provide a photographic reproducing device utilizing a control circuit network incorporating a three electrode AC semiconductor switching device with the triggering means for the switching device controlled by the light transmitting or light reflecting characteristics of the object to be photographically reproduced.

These and other objects will become apparent as the description proceeds with reference to the accompanying drawings in which.

The invention will be described herein as applied to a rotary type microfilm camera of the two-sided type, that is, the type in which both sides of a document are photographed simultaneously. It will be understood that the present invention might be embodied in a single side photographing camera. The present invention might also be embodied in the type of copying apparatus in which the document or object is projected onto electrostatically sensitized material and copied electrostatically. While the invention is described herein as incorporated in a continuous microfilm camera, it can also be applied to the planetary type in which the photographic image is fixed in position and photographed in a single timed exposure. Such adaptations of the present invention are intended to be within its scope.

Figure 1:
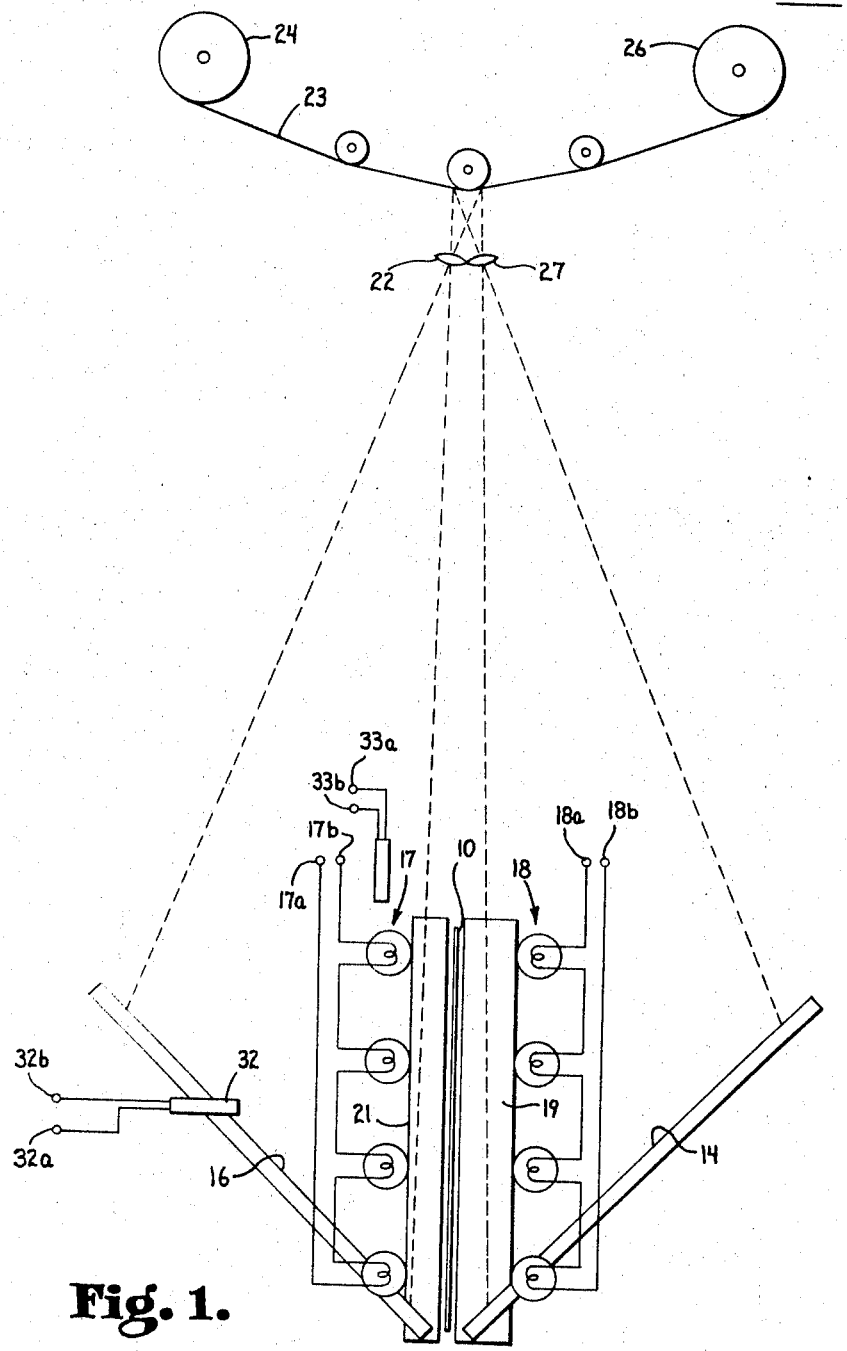
FIG. 1 is a schematic, top plan view of structure embodying the present invention.
Figure 2:
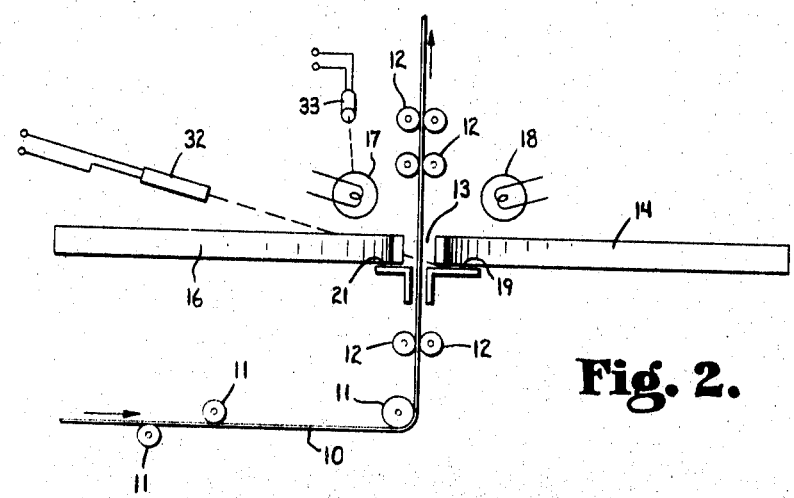
FIG. 2 is a schematic, end view of the structure shown in FIG. 1.

Referring initially to FIGS. 1 and 2, the continuous type microfilm camera accommodates the object to be photographed which may take the form of documents in a continuous strip 10, fed over approach rollers 11 (FIG. 2) and rollers 12 adjacent the photographic aperture, the direction of movement of the document strip being indicated by arrows in FIG. 2.

The photographic aperture area is indicated at 13 in FIG. 2 and is defined by opposed, inclined mirrors 14 and 16. Opposite sides of the document strip passing through the aperture area are illuminated by a bank of series connected lamps 17 and a bank of series connected lamps indicated generally at 18, the electrical terminal connection for the lamp banks being indicated at 17a, 17b, 18a and 18b, respectively. Brackets forming white, reflective surfaces 19 and 21 are positioned adjacent the elements 14 and 16 and serve a purpose to be subsequently described.

The mirror element 16 receives light reflected from one side of the document strip 10 and directs this light to a lens 22 which focuses the light upon a photography sensitive strip 23 moving from a supply roll 24 to an exposed film roll 26 as indicated in FIG. 1. The mirror element 14 directs light reflected from the opposite side of the document strip 10 to a lens 27 which focuses the light upon the strip of photographically sensitive material 23. The image from opposite sides of the document 10 are thus serially deposited on the photographically sensitive strip 23. Mounted adjacent the element 16, so as to receive light reflected from the adjacent side of the document strip 10, is a first light responsive means taking the form of the photocell 32 having circuit connecting terminals 32a and 32b. Mounted adjacent one end of the light bank 17 is a second light sensitive means taking the form of the photocell 33 having electrical connecting terminals 33a and 33b. The photocell 33 is mounted so as to receive light directly from the light bank 17 and does not receive light reflected from the document strip 10.

Figure 3:
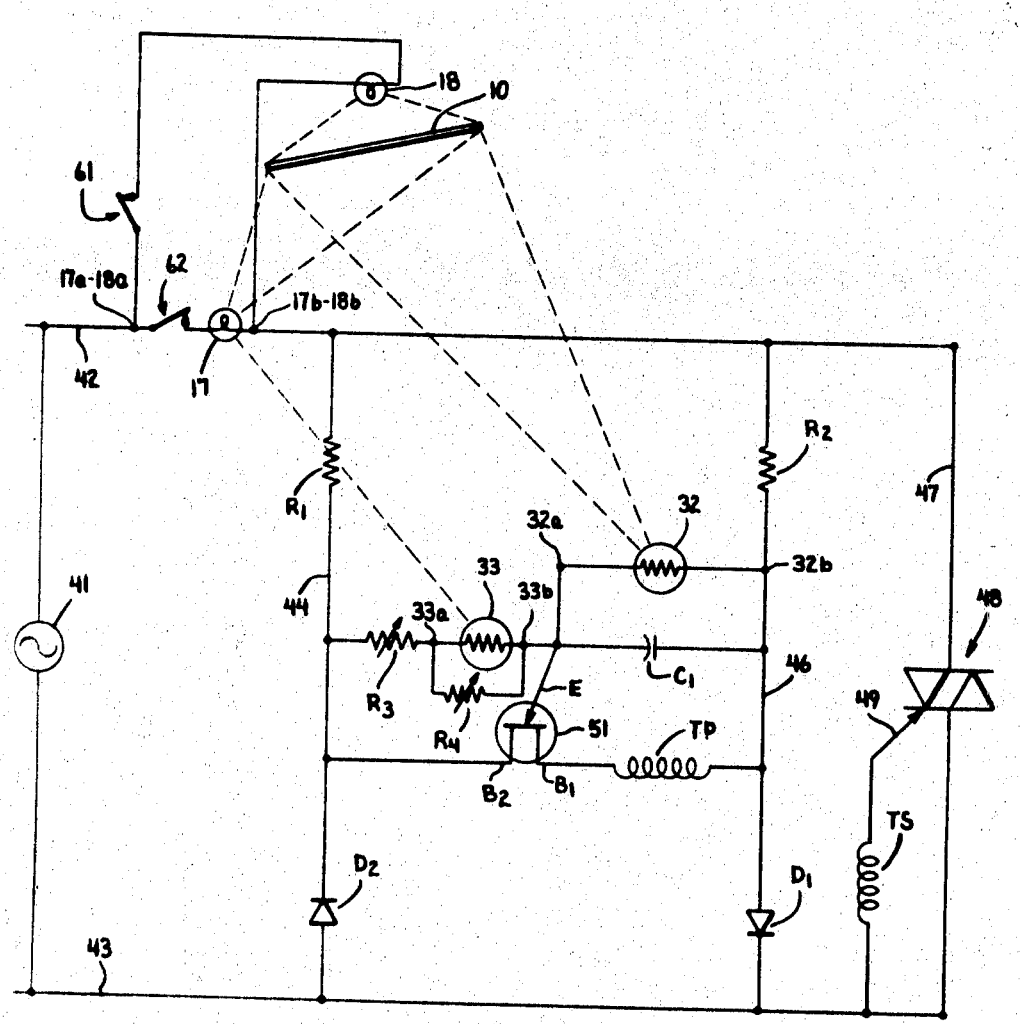
FIG. 3 is a schematic circuit diagram illustrating the circuit of the present invention.

Referring now to FIG. 3 the circuit for connecting the photoelectric cells and the power source for the light banks 17 and 18 will now be described. The light banks 17 and 18 are connected in parallel with each other and across a source of AC electrical power 41 by means of wires 42 and 43. Connected across the wires 42 and 43 is a wire 44 having interposed therein a resistance R1 and a rectifying diode D2. A wire 46 also extends between the wires 42 and 43 and has interposed therein a resistance R2 and a rectifying diode D1.

A wire 47 connected across the wires 42 and 43 has interposed therein a three electrode AC semi-conductor switch element 48. This element is a semi-conductor switch triggered into a conducting state by either a plus or minus gate signal and is manufactured and sold by the General Electric Company under the trademark "Triac." The gate electrode 49 of the element 48 is connected to the secondary winding TS of a pulsing transformer and the opposite side of the pulsing transformer is connected to the wire 43.

A resistance-capacitance timing circuit is provided by the adjustable resistor R3, the photocell 33 connected in series therewith, the photocell having the variable resistance R4 connected in parallel. These elements are connected to the parallel coupled timing condenser C1 and the photocell 32. The terminals of the photocell 32 and the capacitor C1 opposite the circuit elements R3, R4 and photocell 33 are connected to the wire 46. The emitter electrode E of a unijunction transistor 51 is connected to the electrical junction of photocell 33, photocell 32 and capacitor C1. The base-two electrode, identified at B2 in FIG. 3, of the transistor 51 is connected to the wire 44. The base-one electrode, identified at B1 in FIG. 3, of the transistor is connected to one side of the primary, identified at TP, of the pulsing transformer previously referred to with regard to its secondary winding TS. As indicated in FIGS. 1, 2 and 3, the photocell 32 receives light, reflected from the document, which originates at the light bank 17. The photocell 32 also receives light transmitted through the document from the light bank 18. The photocell 33 receives light directly from the light bank 17.

In operation, referring to FIG. 3, when an AC voltage is applied to the lines 42 and 43, electrical power is applied to the light banks 17 and 18 through the switching element 48 which is in series with the light banks across the voltage source. With the switch element 48 in a nonconductive state, the light banks 17 and 18 are off or de-energized. When a positive or a negative signal voltage pulse is applied to the gate terminal 49 of the element 48, the element 48 will become fully conductive in either direction, depending upon the direction or polarity of the triggering pulse. The current through the element 48 is limited only by the load in series with it (the light banks 17 and 18). The triggering gate pulse for the element 48 is produced by the transistor circuit incorporating the transistor 51 and is transferred from that circuit to the gate electrode of the element 48 by means of the pulsing transformer whose primary and secondary windings are identified at TP and TS in FIG. 3.

With the element 48 in a non-conductive state, the lamp load formed by the lamp banks 17 and 18 act as a low resistance impedance in series with the transistor firing circuit. With an AC voltage applied in a forward direction across the wires 42 and 43, current will pass through the lamp load, through the resistor R1, through the circuit network including resistor R3, R4 and photocell 32 and back to the wire 43 through the diode D1. Since photocell 32 is not illuminated because of the deenergized state of the light banks 17 and 18, the current flow will charge condenser C1, connected in parallel to the photocell 32, because of the relatively high resistance, when not illuminated, of the photocell 32. As the condenser C1 charges the voltage across the emitter electrode E and the base-one electrode B1 of the transistor 51 will reach the breakdown or triggering voltage for the transistor 51 and thereupon the resistance across E and B1 will fall to a negligible value and the condenser C1 will discharge rapidly through transformer primary TP.

This discharge through the transformer primary will produce a voltage pulse in the transformer secondary TS and will trigger the element 48 to a fully conductive state. The element 48 will continue to conduct through the remaining portion of the AC voltage half cycle. As the AC voltage reverses for the next half cycle, current will pass through the diode D2, the resistor R3, the resistor R4, the photocell 33, the photocell 32 and through resistance R2 back to the line 42. The condenser C1 will charge at a rate inversely proportional to the quantity of light received by the photocell 32. The charge on the condenser C1 will eventually reach the breakdown point of the transistor 51, causing the transistor to become conductive and producing a discharge of condeneser C1 through the transformer primary TP, providing a voltage pulse in the transformer secondary TS, the voltage pulse being of opposite polarity from the voltage pulse triggering the element 48 in the preceding half cycle. The voltage pulse causes the element 48 to become conductive in the proper direction and will pass current through the light banks 17 and 18. This conduction by the element 48 continues for each positive and negative alternation of the AC power source, maintaining the light banks 17 and 18 in illuminating or energized condition.

It will be evident that the intensity of the light banks 17 and 18, that is, the power input thereto is dependent upon the position in the alternating voltage half cycle at which the condenser C1 discharges. As will be evident from the circuit of FIG. 3 the discharge point in any alternating voltage half cycle for the condenser C1 is dependent upon the resistance of the photocell 32 and this resistance varies inversely with the degree of illumination of the photocell. Thus, when little light is reflected to the photocell 32, indicating a relatively dark or nonreflective document portion on the document strip, the resistance of photocell 32 will be relatively high and condenser C1 will charge relatively rapidly and the breakdown voltage for the transistor 51 will be reached relatively early in the source voltage alternation half cycle. A long pulse of current will be delivered to the lamp banks 17 and 18 and the light output of the banks will be raised appropriately. Conversely, if the resistance of photocell 32 is relatively low, indicating a relatively large quantity of light reflected on the photocell from the document, the condenser C1 will charge more slowly, triggering the transistor 51 to a conductive state later in the AC half cycle and reducing the power input to the light banks 17 and 18. The level of energization of the light source, formed by the light banks 17 and 18, is thus varied inversely with the level of illumination of the photocell 32. Since, as disclosed in my above mentioned copending application, light reaching the photocell 32 is reflected from the document at a point just prior to its entry into the aperture area 13, the illumination level of the light banks 17 and 18 is varied in accord with the reflectivity of the document surface.

The photocell 32 is positioned, as indicated particularly in FIG. 1, to receive either reflected light from the document surface or light transmitted through the document from the light bank 18, depending on which of the light banks is energized (selective energization being accomplished by manipulation of switches 61 and 62 of FIG. 3). The photocell 32 thus reads document brightness, this brightness being produced by reflected or transmitted light or by combination of the two. By employing a photocell of the proper characteristics of color sensitivity and of light intensity to photocell resistance characteristic, a relation can be established whereby the response of the photocell 32 will result in a constant foot-lambert brightness of the document. With varying surface colors and qualities, the photocell will control lamp intensity so as to give constant foot-lambert readings from the document surfaces. This will result in a constant density photographic image on a uniform photographic emulsion. The intensity of the light illuminating the document at the photographic aperture is thus controlled to produce a constant subject brightness.

The photocell 33, positioned to receive light directly from the light bank 17 acts as a response linearity control. With the variable resistance R4 adjusted to a relatively high resistance value and the variable resistance R3 adjusted to a relatively low resistance value, since the photocell 33 is in series with the condenser C1, the degree of illumination of the photocell 33, and hence its conductivity, will directly affect the charging time of the condenser C1. The response of the photocell 33 thus acts as a positive feedback (dependent on the adjustment of resistances R3 and R4) to the circuit network. The level of energization of the light source provided by the light banks 17 and 18 is thus varied directly with the level of illumination of the photoelectric cell 33. The presence of the photocell 33 and the adjustability of the resistors R3 and R4 connected in circuit with it provide a response linearity control exemplified in FIG. 4.

Figure 4:
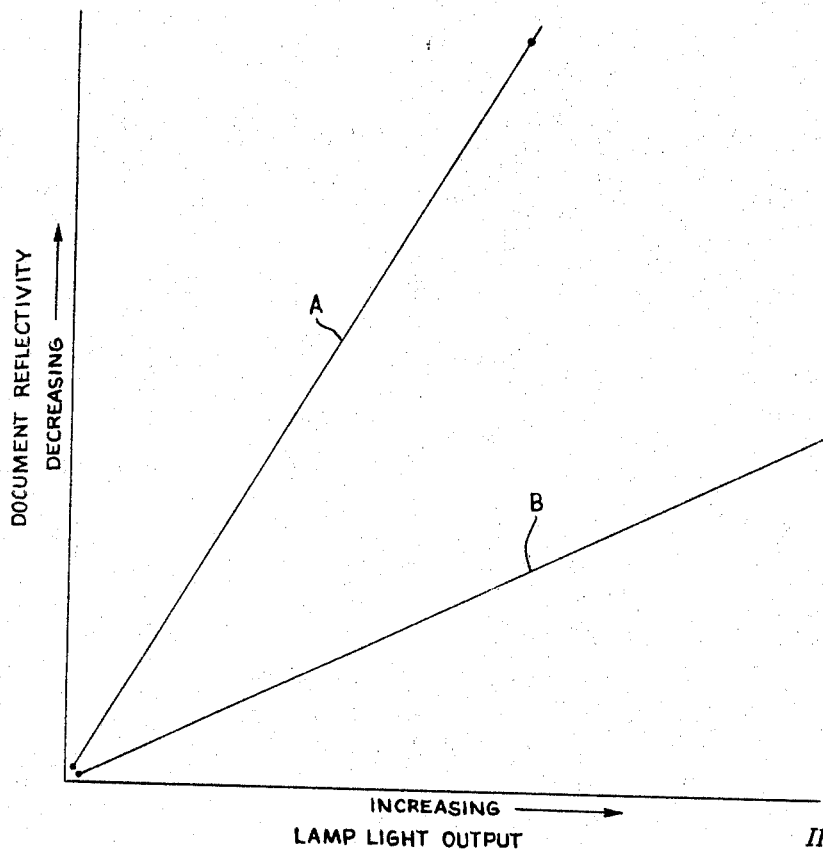
FIG. 4 is a diagram indicating the document or object reflectivity versus light output characteristic of the apparatus embodying the present invention when certain circuit parameters are varied.

Referring to FIG. 4, the line A represents the light bank output variation with decreasing document reflectivity when R4 is adjusted to minimum resistance, that is, with photocell 33 shunted. With R4 set at minimum value, the positive feedback provided the control system by the photocell 33 will be at a minimum or substantially eliminated.

The line B of FIG. 4 illustrates the light bank output with decreasing document reflectivity when resistance R4 is set to a maximum value or when, in effect, the circuit to our R4 is opened. Under these conditions the feedback provided by photocell 33 is at a maximum. It will be evident that by means of the adjustability of resistors R3 and R4, thereby establishing the effectiveness of the photocell 33 in providing a positive feedback to the circuit, a convenient means for adjusting the response linearity is provided.

The circuit components may have the following characteristics or identities: resistor R3 may have a maximum resistance of 50,000 ohms and the resistor R4 may have a maximum value of 250,000 ohms. The resistors R1 and R2 may have a resistance of 10 kilohms each. The photocells 32 and 33 may be the Clairex 905HL type. The transistor 51 may be identified by type number 2N1671A. The diodes D1 and D2 may be of the type number 1N1695.

As will be evident from FIG. 1, when no document 10 is present in the apparatus the photocell 32 will view light reflected from the bracket surfaces 21 and 19 (surface 19 being somewhat wider than surface 21 to accommodate the viewing angle of the photocell). The bracket surfaces are equivalent in brightness (light reflectivity) to the brightness of an average document processed through the apparatus. This permits the power input change to the lamps for varying document reflectivities to be relatively small. With the light intensity at an average brightness when there is no document in the aperture (because photocell 32 views average reflectivity surfaces 19 and 21), only an adjustment of minor magnitude is necessary to correct the lamp intensity for proper exposure of documents of reflectivity varying from the average as they pass through the aperture. Since the intensity of the lamp banks can be varied several watts in a time interval of the order of several milliseconds, the photocell 32 may be aimed at an area only a very short distance upstream (with reference to document movement) of the photographic aperture so that the photocell will sense and adjust the light intensity a few milliseconds before the document enters the aperture.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A continuous flow photographic reproducing device comprising, a document transport means for feeding documents in timed sequence along a predetermined path for photographing at a photograph station, a light source adapted when energized to illuminate said documents for photographing and to project light upon the increment of said path just ahead of said photograph station and upon the portion of said path extending through said photograph station, a first photoelectric cell adapted to collect light energy impinging upon a document just prior to photographing and when in said path increment, a second photoelectric cell adapted to receive light energy directly from said light source independently of light impingement on the document, a source of electrical power for energizing said light source, a fast-response control circuit network for controlling the level of energization of said light source by said power source in response to the variation in effectiveness of an input signal provided by said photoelectric cells, said photoelectric cells being coupled with said circuit network to vary the effectiveness of said input signal and consequently the level of energization of said light source inversely with the level of illumination of said first photoelectric cell and directly with the level of illumination of said second photoelectric cell.

2. A photographic reproducing device as claimed in claim 1 in which the relative prominence of said photoelectric cells in varying the effectiveness of said input signal is adjustable.

3. A photographic reproducing device as claimed in claim 1 in which the ability of said second photoelectric cell to vary the effectiveness of said input signal is adjustable.

4. A photographic reproducing device as claimed in claim 1 in which said circuit network includes a timing capacitor and has said first photoelectric cell connected in parallel therewith and said second photoelectric cell connected in series with the timing capacitor.

5. A photographic reproducing device as claimed in claim 1 in which said circuit network includes a three electrode AC semi-conductor switching device and associated triggering means for controlling the phase relationship of the voltage applied to and current passing through said switching device, and in which said triggering means is controlled by said input signal.

6. A continuous flow photographic reproducing device comprising, a document transport means for feeding documents in timed sequence along a predetermined path for photographing at a photograph station, a light source adapted when energized to illuminate said documents for photographing and to project light upon the increment of said path just ahead of said photograph station and upon the portion of said path extending through said photograph station, a first light responsive means adapted to collect light energy impinging upon a document just prior to photographing and when in said path increment, a second light responsive means adapted to receive light energy directly from said light source independently of light impingement on the document, a source of electrical power for energizing said light source, a fast-response control circuit network for controlling the level of energization of said light source by said power source in response to the variation in effectiveness of an input signal provided by said first and second light responsive means, said first and second light responsive means being coupled with said circuit network to vary the effectiveness of said input signal and consequently the level of energization of said light source inversely with the level of illumination of said first light responsive means and directly with the level of illumination of said second light responsive means.

7. A photographic reproducing device as claimed in claim 6 in which the relative prominence of said first and second light responsive means in varying the effectiveness of said input signal is adjustable.

8. A photographic reproducing device as claimed in claim 6 in which the ability of said second photoelectric cell to vary the effectiveness of said input signal is adjustable.

9. A photographic reproducing device as claimed in claim 6 in which said circuit network includes a three electrode AC semi-conductor switching device and associated triggering means for controlling the phase relationship of the voltage applied to and current passing though said switching device, and in which said triggering means is controlled by said input signal.

10. A photographic reproducing device comprising, a document accommodating means for retaining documents in sequentially assumed positions along a predetermined path for photographing at a photograph station, a light source adapted when energized to illuminate said documents for photographing and to project light upon the increment of said path just ahead of said photograph station and upon the portion of said path extending through said photograph station, a first photoelectric cell adapted to collect light energy impinging upon a document just prior to photographing and when in said path increment, a second photoelectric cell adapted to receive light energy directly from said light source independently of light impingement on the document, a source of electrical power for energizing said light source, a fast-response control circuit network for controlling the level of energization of said light source by said power source in response to the variation in effectiveness of an input signal provided by said photoelectric cells, said photoelectric cells being coupled with said circuit network to vary the effectiveness of said input signal and consequently the level of energization of said light source inversely with the level of illumination of said first photoelectric cell and directly with the level of illumination of said second photoelectric cell.

References Cited
UNITED STATES PATENTS

| | | | |
|---|---|---|---|
| 2,843,756 | 7/1958 | Wise et al. | 250—210 |
| 2,995,978 | 8/1961 | Glandon et al. | 250—207 X |
| 3,016,787 | 1/1962 | Brehm | 250—207 X |
| 3,372,617 | 3/1968 | Pfaff | 88—24 |
| 3,392,284 | 7/1968 | Cain | 250—214 |

WALTER STOLWEIN, *Primary Examiner.*

U.S. Cl. X.R.

88—24; 250—209, 214